(12) United States Patent
Presley

(10) Patent No.: US 6,497,450 B2
(45) Date of Patent: Dec. 24, 2002

(54) DUAL ACTION SPOILER WITH CAM ACTUATED TIPS

(75) Inventor: William T Presley, Macomb Township, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 10/026,249

(22) Filed: Dec. 20, 2001

(65) Prior Publication Data

US 2002/0074826 A1 Jun. 20, 2002

Related U.S. Application Data

(60) Provisional application No. 60/257,242, filed on Dec. 20, 2000.

(51) Int. Cl.⁷ .......................... B62D 37/02; B62D 35/00
(52) U.S. Cl. .............................. 296/180.5; 296/180.1; 180/903
(58) Field of Search ................ 396/180.1, 180.5, 396/180.3, 217, 91; 180/903; 244/213, 214, 113

(56) References Cited

U.S. PATENT DOCUMENTS

| | | | | |
|---|---|---|---|---|
| 3,104,079 A | * | 9/1963 | Phillips | 244/113 |
| 3,144,220 A | * | 8/1964 | Kittelson | 244/199 |
| 3,512,825 A | * | 5/1970 | Green | 296/180.5 |
| 3,612,440 A | * | 10/1971 | Strong | 244/2 |
| 4,160,494 A | * | 7/1979 | McCambridge | 180/903 |
| 4,925,236 A | * | 5/1990 | Itoh et al. | 296/180.1 |
| 5,052,745 A | * | 10/1991 | Preiss | 296/180.5 |
| 5,120,105 A | * | 6/1992 | Brin et al. | 296/180.5 |
| 5,522,637 A | * | 6/1996 | Spears | 296/180.3 |
| 5,536,062 A | * | 7/1996 | Spears | 180/903 |
| 5,544,931 A | * | 8/1996 | Nelson | 296/180.1 |
| 5,923,245 A | * | 7/1999 | Klatt et al. | 180/68.3 |
| 6,378,935 B2 | * | 4/2002 | Fasel et al. | 180/903 |

* cited by examiner

Primary Examiner—D. Glenn Dayoan
Assistant Examiner—Patricia L. Engle
(74) Attorney, Agent, or Firm—Ralph E. Smith

(57) ABSTRACT

A wing mechanism for selectively exerting a downwardly directed force to a vehicle having a vehicle body. The wing mechanism includes a wing member, a pair of wing tips and a drive assembly. The pair of wing tips are moveably coupled to opposing ends the wing member and arranged to be moved by the drive assembly between a retracted position wherein the wing tips are retracted within a cavity in the wing member and a deployed position wherein each of the wing tips extends outwardly from the perimeter of the wing member.

6 Claims, 3 Drawing Sheets

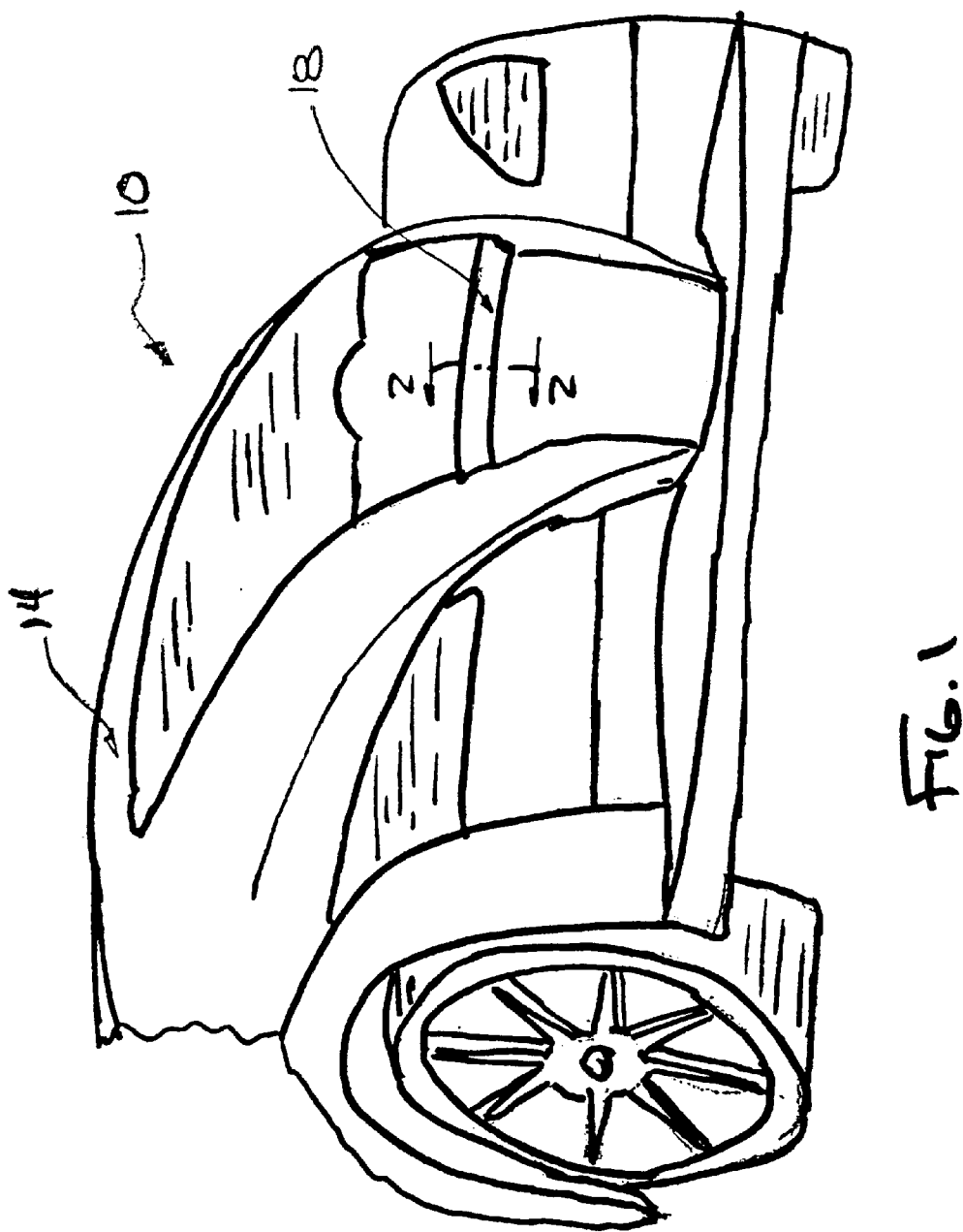

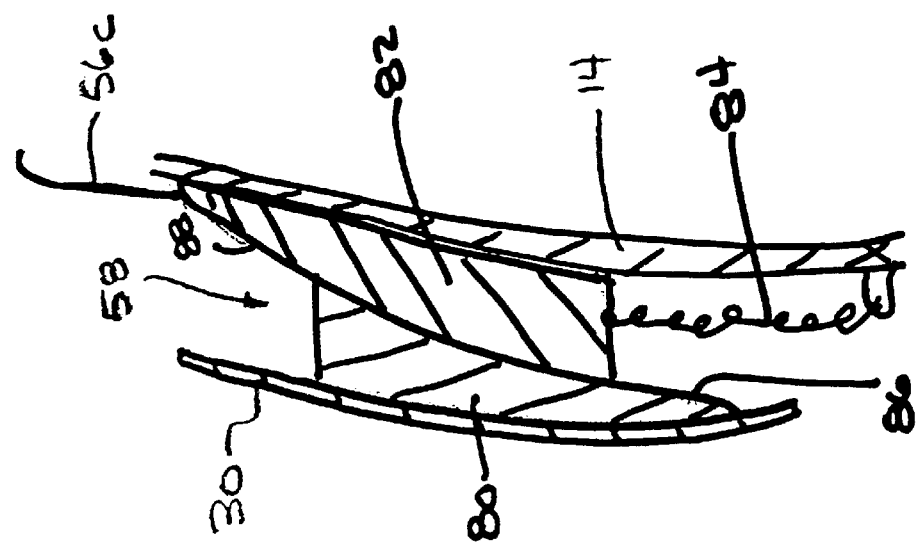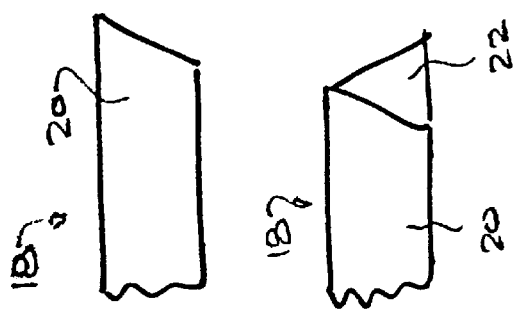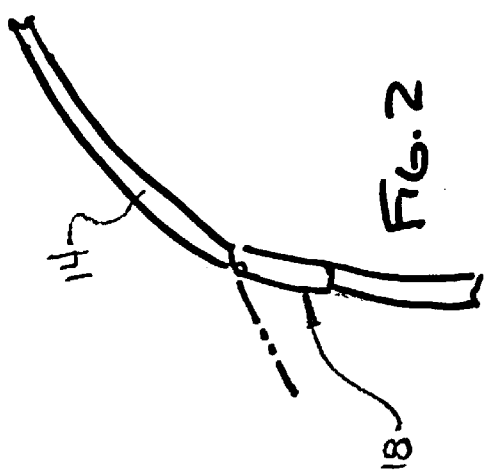

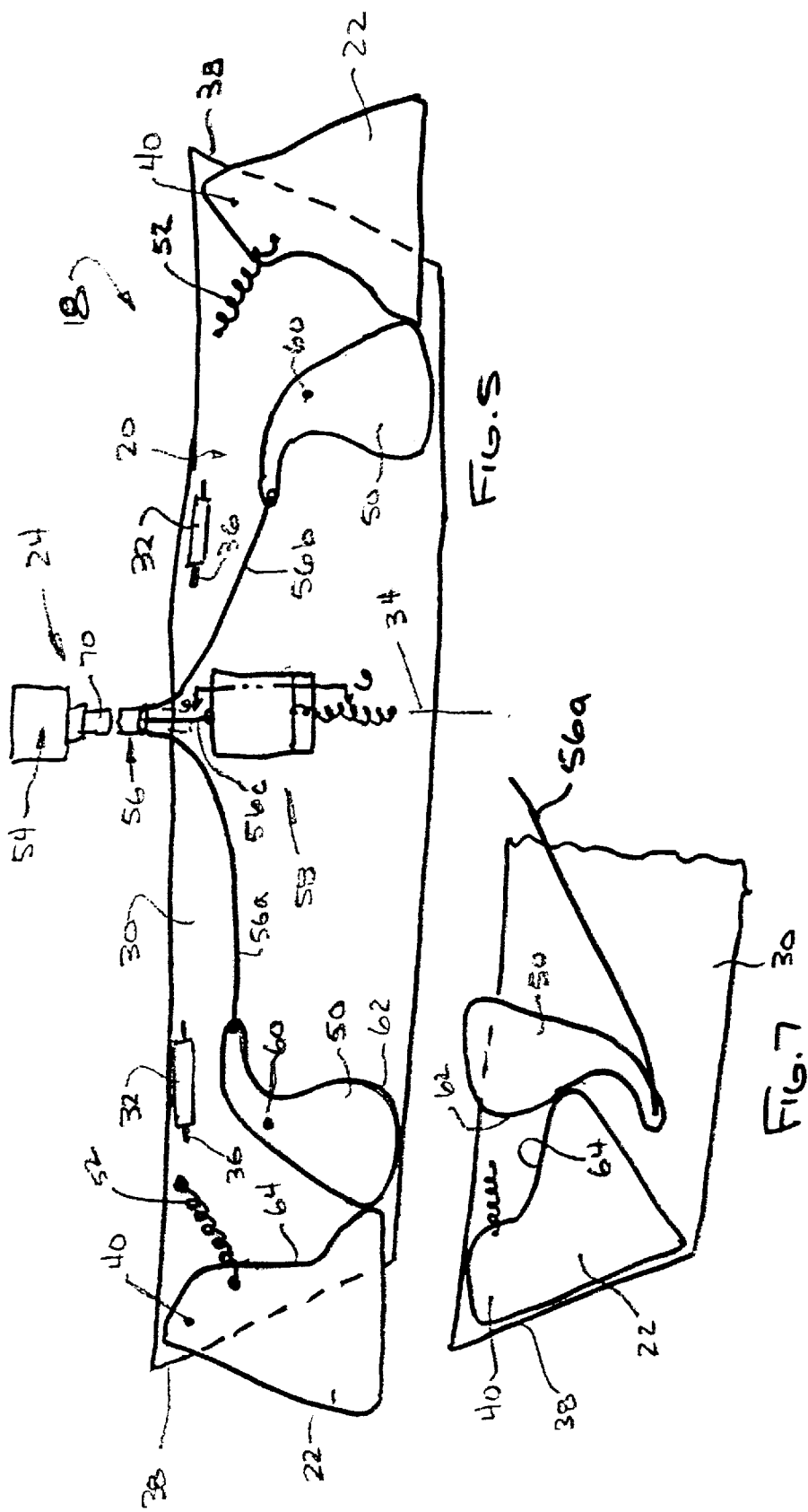

DUAL ACTION SPOILER WITH CAM ACTUATED TIPS

CROSS-REFERENCE TO RELATED APPLICATIONS

This application claims the benefit of United States Provisional Patent Application Ser. No. 60/257,242, filed on Dec. 20, 2000.

BACKGROUND OF THE INVENTION

1. Field of the Invention

The present invention relates generally to wing mechanisms, air spoilers and air foils for a motor vehicle, and more particularly to a rear wing mechanism that is selectively positioned from within the vehicle cockpit.

2. Background Art

Genrally, various types of rear spoilers or wing mechanisms for motor vehicles have been proposed in order to improve high-speed stability of vehicles. In some arrangements, a fixed-type rear spoiler is used in which a spoiler fin or wing member is fixedly mounted to a rearward portion of the vehicle. However, rear wing mechanisms of this type are known to undesirable affect the performance characteristics of the vehicle when the vehicle is operated at relative low speeds.

Alternative approaches have included using a retractable rear wing mechanism in which the wing member is wholly retracted into the body of the vehicle when the stabilizing effect of the wing mechanism is unnecessary. However, because the wing must be stowed within the vehicle, these types of arrangements typically intrude into and reduce the interior space, such as a trunk compartment, available for the vehicle. Accordingly, there remains a need in the art for an effective yet relatively compact wing mechanism.

SUMMARY OF THE INVENTION

In accordance with one aspect of the present invention, a wing mechanism is provided for selectively exerting a downwardly directed force to a vehicle body. The wing mechanism includes a wing member pivotably coupled to the vehicle body. A pair of wing tips are moveably coupled to the wing member at opposing ends. The wing tips are selectively moveable between a retracted position wherein the wing tips are retracted within a cavity in the wing member and a deployed position wherein each of the wing tips extend outwardly from the perimeter of the wing member. A drive assembly is coupled to the wing tips for selectively moving the wing tips between the extended position and the retracted position.

In accordance with other aspects of the present invention, the drive assembly is further coupled to the wing member to control rotational position of the wing member about the pivot coupling to the vehicle body. The drive assembly can include a pair of cams selectively moveable by a drive motor, each of the cams positioned relative to a respective one of the wing tips to engage a cam follower located on each wing tip to move the wing tip to the deployed position. Each of the wing tips can be spring biased to the retracted position. Still further, the drive assembly can be coupled to the wing member and the cams, and arranged to move each cam in conjunction with moving the wing member about the pivot coupling to the vehicle body.

These and other aspects, features, and advantages of the present invention will be readily apparent from the following detailed description of the preferred embodiment(s) when taken in connection with the accompanying drawings

BRIEF DESCRIPTION OF THE DRAWINGS

FIG. 1 is a perspective view of a portion of the rear of a vehicle constructed in accordance with the teachings of the present invention;

FIG. 2 is a cross-sectional view taken along the line 2—2 of FIG. 1;

FIG. 3 is a top view of a portion of the vehicle of FIG. 1 illustrating the wing mechanism with the wing tips in a retracted position;

FIG. 4 is a top view of a portion of the vehicle of FIG. 1 illustrating the wing mechanism with the wing tips in an extended position;

FIG. 5 is a bottom view of a portion of the vehicle of FIG. 1 illustrating the wing mechanism in greater detail;

FIG. 6 is a cross-sectional view taken along the line 6—6 of FIG. 5; and

FIG. 7 is a view similar to that of FIG. 5 but illustrating the wing tip in a retracted position.

DETAILED DESCRIPTION OF THE PREFERRED EMBODIMENT(S)

With reference to FIGS. 1 and 2 of the drawings, a vehicle constructed in accordance with the teachings of the present invention is generally indicated by reference numeral 10. As will be discussed in greater detail below, vehicle 10 includes a vehicle body 14 and a wing mechanism 18, which may be articulated between a first position, shown in FIG. 1, wherein the wing mechanism 18 is retracted and generally flush to the vehicle body 14 and a second deployed position, shown in phantom in FIG. 2, wherein the wing mechanism 18 is extended upwardly relative to the vehicle body 14 so as to vary the magnitude of a downwardly exerted force which is transmitted from wing mechanism 18 to vehicle body 14. Although the particular vehicle illustrated is a two-door sport coupe, it will be understood that the teachings of the present invention have applicability to other types of vehicles.

With additional reference to FIGS. 3 through 7, the wing mechanism 18 is shown to include a wing structure 20, a pair of wing tips 22 and a drive assembly 24. The wing structure 20 includes a wing member 30 and a pair of laterally spaced supports 32 that are configured to support the wing member 30 across a longitudinal axis 34 of the vehicle body 14. A pair of first pivot pins 36 pivotably couples the wing structure 20 to the vehicle body 14.

In the particular embodiment illustrated, each of the wing tips 22 is generally triangular in shape and pivotably coupled to one of the opposite lateral sides 38 of the wing member 30 via a second pivot pin 40. The wing tips 22 are rotatable about their associated second pivot pin 40 between a retracted position, as shown in FIG. 7, wherein the wing tips 22 are retracted within a cavity in wing member 30 and do not extend in a lateral direction beyond a perimeter of the wing member 30, and a deployed position, as shown in FIG. 5 wherein each of the wing tips 22 extends outwardly from the wing member 30.

In the particular embodiment illustrated, the drive assembly 24 includes a pair of cams 50, a pair of return springs 52, a linear motor 54, a cable assembly 56 and a wedge block mechanism 58. Each of the return springs 52 is coupled to an associated one of the wing tips 22 and is configured to exert a force onto its associated wing tip 22 that biases the associated wing tip 22 toward the retracted position. Each of the cams 50 is pivotably coupled to the wing member 30 and rotatable about a third pivot pin 60 and rotatable between a first position (shown in FIG. 7) and a second position (shown in FIG. 5). Each cam 50 includes a cam surface 62 that is configured to contact a follower surface 64 formed into the inner side of the wing tips 22. Rotation of the cam 50 between the first position and the second position causes the cam surface 62 to cooperate with the follower surface 64 to rotate the wing tip 22 about its associated second pivot pin 40 between the retracted and extended positions.

In the example provided, movement of the cams 50 and the wing member 30 is controlled by the linear motor 54. The linear motor 54 is conventionally operable for moving an output member 70 in an axial direction between a first position (shown in phantom) and a second position. The output member 70 of the linear motor 54 is coupled to a cable assembly 56 having three output cables 56*a*, 56*b* and 56*c*. Each of the output cables 56*a* and 56*b* is coupled to an associated one of the cams 50, with linear movement of the output member 70 causing each of the cams 50 to rotate about their third pivot pin 60.

The output cable 56*c* is coupled to the wedge block mechanism 58. The wedge block mechanism 58 is illustrated in FIG. 6 to include a first wedge block 80 that is fixedly coupled to the wing member 30, a second wedge block 82 that is slidingly coupled to the vehicle body 14 and a spring 84 for biasing the position of the second wedge block 82. The first wedge block 80 includes a first angled contact surface 86 that abuts a second angled contact surface 88 that is formed into the second wedge block 82. Movement of the second wedge block 82 relative to the first wedge block 80 varies the overall height of the wedge block mechanism 58, causing the wing member 30 to pivot about the pair of laterally spaced supports 32. The spring 84 biases the second wedge block 82 toward a position that generally reduces the overall height of the wedge block mechanism 58, thereby biasing the wing member 30 toward the retracted position. Movement of the output member 70 of the linear motor 54 toward the second position moves the second wedge block 82 relative to the first wedge block 80 in a manner that increases the overall height of the wedge block mechanism 58, thereby elevating the wing member 30 from the retracted position toward the extended position.

Accordingly, those skilled in the art will understand that the rotation of the wing tips 22 about their associated second pivot pin 40 is timed with the rotation of the wing member 30 relative to the vehicle body 14. Rotation of the wing member 30 into the fully extended position permits the wing tips 22 to rotate outwardly to their fully extended position, thereby increasing the overall area of the wing mechanism 18.

While one or more embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A wing mechanism for selectively exerting a downwardly directed force to a vehicle body, the wing mechanism comprising:

a wing member pivotably coupled to the vehicle body;

a pair of wing tips moveably coupled to the wing member at opposing ends, the wing tips moveable between a retracted position wherein the wing tips are retracted within a cavity in the wing member and a deployed position wherein each of the wing tips extend outwardly from the perimeter of the wing member; and a drive assembly coupled to the wing tips for selectively moving the wing tips between the deployed position and the retracted position.

2. The wing mechanism of claim 1 wherein the drive assembly is further coupled to the wing member to control rotational position of the wing member about the pivot coupling to the vehicle body.

3. The wing mechanism of claim 1 wherein the drive assembly comprises a pair of cams selectively moveable by a drive motor, each of the cams positioned relative to a respective one of the wing tips to engage a cam follower located on each wing tip to move the wing tip to the deployed position.

4. The wing mechanism of claim 3 wherein each wing tip is spring biased to the retracted position.

5. The wing mechanism of claim 4 wherein said drive assembly is further coupled to the wing member and arranged to move each cam in conjunction with moving the wing member about the pivot coupling to the vehicle body.

6. The wing mechanism of claim 5 wherein the wing member is spring biased to a vertically deployed position.

\* \* \* \* \*